Sept. 27, 1960  A. F. WELLING  2,954,240
QUICK CHANGE HITCH FOR AGRICULTURAL IMPLEMENTS
Filed Sept. 19, 1958  2 Sheets-Sheet 1

INVENTOR.
ALVIN F. WELLING,
BY
McMorrow, Berman & Davidson
ATTORNEYS.

Sept. 27, 1960  A. F. WELLING  2,954,240
QUICK CHANGE HITCH FOR AGRICULTURAL IMPLEMENTS
Filed Sept. 19, 1958  2 Sheets-Sheet 2
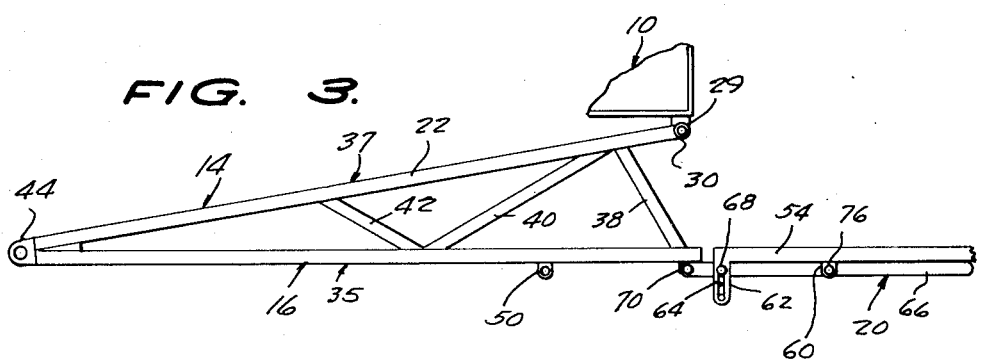
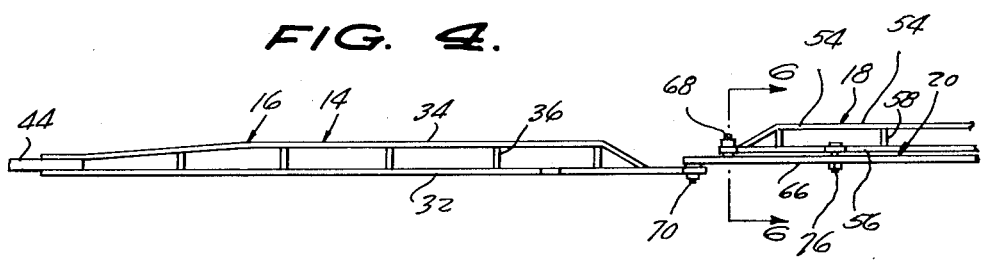
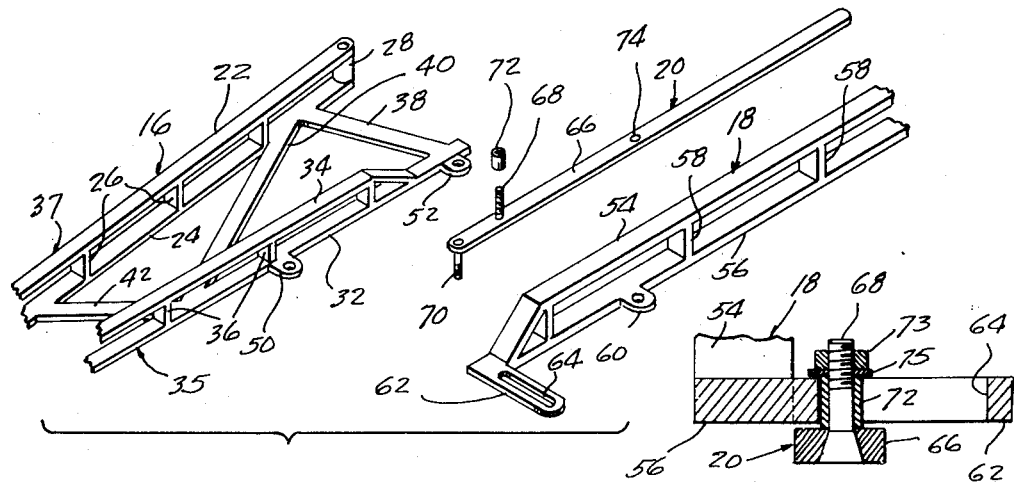
INVENTOR.
ALVIN F. WELLING,
BY
McMorrow, Berman & Davidson
ATTORNEYS.

United States Patent Office 2,954,240
Patented Sept. 27, 1960

2,954,240

QUICK CHANGE HITCH FOR AGRICULTURAL IMPLEMENTS

Alvin F. Welling, R.F.D. 1, Millbury, Ohio

Filed Sept. 19, 1958, Ser. No. 762,077

10 Claims. (Cl. 280—462)

This invention relates generally to hitches, and more particularly has reference to a hitch which is especially adapted for use on agricultural implements, machinery, or the like. As will presently appear, however, the hitch may have utility in other situations and it is not desired, except as necessarily required by the scope of the appended claims, to limit the use of the invention to the particular environment illustrated in the drawings by way of example.

It is desirable, in hitches used on agricultural implements, to permit quick changing of the hitch position. In many instances, an implement is drawn by a tractor, or equivalent traction vehicle. During actual use of the implement, it is disposed laterally outwardly from the path along which the traction vehicle moves. However, at such time as the implement is being drawn to or from the field in which operations are performed, it is desirable that the implement be movable inwardly, completely or at least partially in the path along which the traction vehicle moves. In this way, the over-all width of the traction vehicle and implement is reduced, to facilitate road travel or storage.

While heretofore hitches have been provided for the purpose of selectively adjusting the lateral displacement of the drawn implement relative to the traction vehicle, those hitches that have been previously devised for this purpose have, to my knowledge, had certain deficiencies. For example, in some cases the hitches may be excessively complicated, while in other cases they do not permit rapid changing of the hitch position of the implement. Still further, the hitches previously devised, it has been noted, are not characterized by the requisite strength. Such strength is of importance, while still keeping the construction and operation of the hitch as free of complexity as possible, a strong hitch being needed particularly when the vehicle is laterally displaced relative to the tractor or other traction vehicle pulling the same.

One important object of the present invention, accordingly, is to provide a hitch which will be characterized by its ruggedness, while being at the same time capable of manufacture at a relatively low cost.

Another object of importance is to provide a hitch which will be so designed as to be trouble-free in operation, and which will be further designed so as to require a minimum amount of maintenance, repair, or replacement of its component parts.

Another object of importance is to provide a hitch that will be so formed as to be swiftly and easily attachable to or detachable from conventional traction and drawn vehicles or implements, without requiring modification or redesign of said vehicles or implements in any way.

Still another object of importance is to provide a hitch as stated that will not interfere with normal operation of the traction or drawn vehicles or implements.

A further object of importance is to provide a device as stated that will be characterized by a particularly high degree of ease and swiftness, in respect to the making of adjustments of the hitch position.

Other objects will appear from the following description, the claims appended thereto, and from the annexed drawings, in which like reference characters designate like parts throughout the several views, and wherein:

Figure 3 is an enlarged top plan view of the device per se, the drawn implement being illustrated fragmentarily;

Figure 4 is a side elevational view of the device on the same scale as Figure 3, a portion of the device being broken away;

Figure 5 is a fragmentary, exploded perspective view of the device on a still larger scale; and Figure 6 is a detail sectional view taken substantially on line 6—6 of Figure 4, the scale being enlarged still further.

Figure 1:
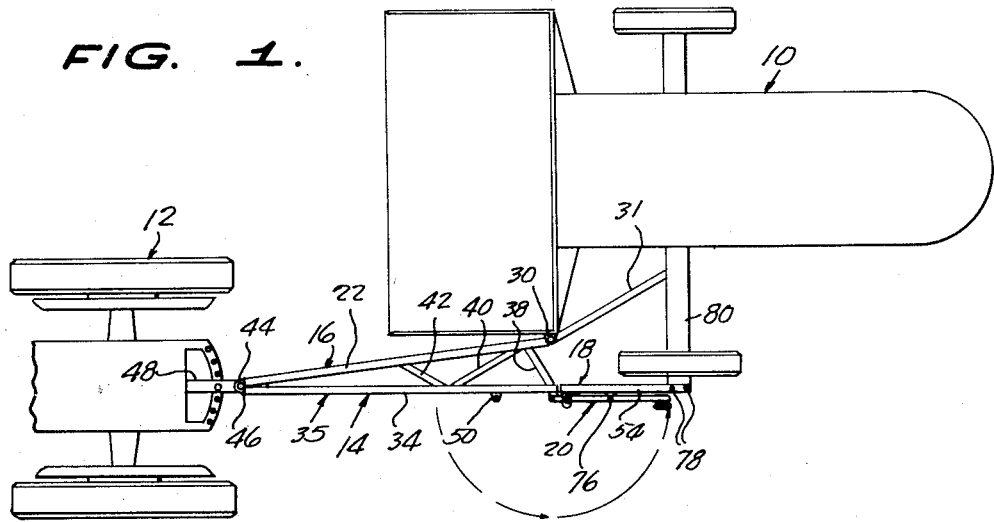
Figure 1 is a somewhat diagrammatic, fragmentary top plan view showing a drawn implement, and showing a portion of a traction vehicle, with the hitch being operatively connected between the same, the hitch being in its inner position during road travel or storage.

Referring to the drawings in detail, generally designated at 10 is a drawn vehicle. In the illustrated example, a combine has been shown somewhat diagrammatically. However, as will presently appear any implement or vehicle may be used with the hitch, that shown being merely illustrative of one of many that might be connected to the rear end of the hitch.

Generally designated at 12 is the traction vehicle. In the illustrated example a tractor is shown. However, again it will be apparent that the traction vehicle might be any of various vehicles or implements. Accordingly, hereinafter the terms "drawn vehicle" and "traction vehicle" will be used in their broad, generic sense, to designate two structures between which the hitch is connected.

Figure 2:
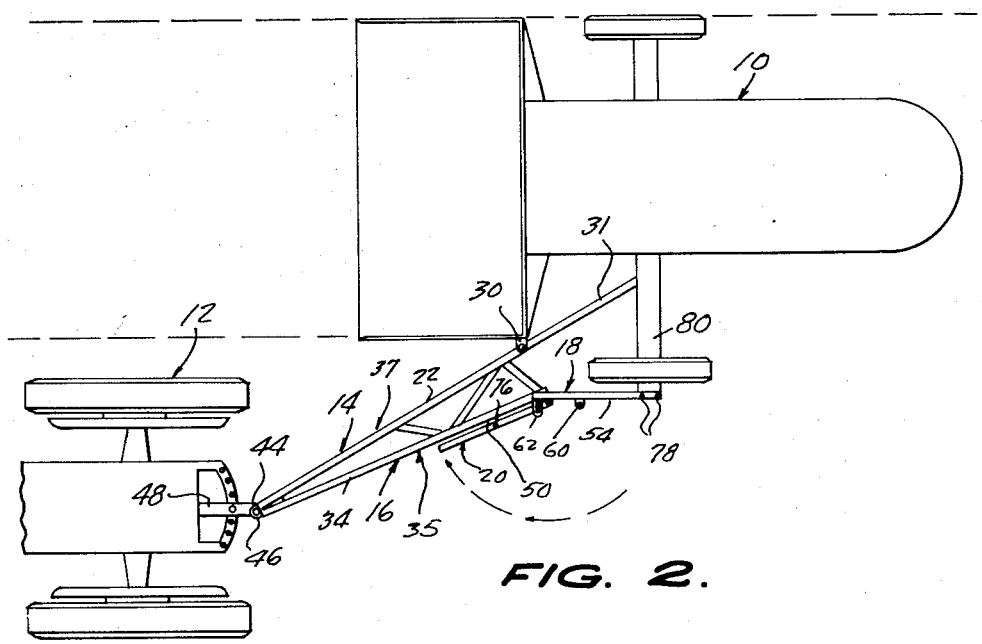
Figure 2 is a view like Figure 1 in which the hitch has been adjusted to its outer position during use of the implement in the field.

In any event, as will be noted from Figures 1 and 2, the drawn vehicle 10 is to be adjusted to different positions in respect to its lateral displacement from the traction vehicle 12. In Figure 1, the drawn vehicle is in an inner position in which it is laterally displaced to the minimum extent, being disposed partially in the path traveled by the traction vehicle. This is the position of the drawn vehicle during road travel or storage.

In Figure 2 the drawn vehicle is shown in its outwardly adjusted position. In this position the drawn vehicle has its working end laterally outwardly displaced completely from the traction vehicle 12. This would be the position of the drawn vehicle during use of the same in the field.

Generally designated 14 is the hitch comprising the present invention. This is connected between the traction and drawn vehicles 12, 10, respectively.

Referring to Figure 5, it will be seen that the hitch comprises three main components, namely, a draw bar assembly generally designated 16, a tongue assembly generally designated 18, and a lever generally designated 20, said lever serving to connect the assemblies 16, 18 to each other.

Considering first the construction of the assembly 16, as shown in Figure 5 it is of truss-like formation, including an elongated, straight upper bar 22 and lower bar 24 spaced apart in longitudinal alignment by short connector pieces 26. The pieces 26 are uniformly spaced, in a typical embodiment of the invention, longitudinally of the bars 22, 24, and are welded or otherwise fixedly connected to said bars.

Connected between the rear ends of the bars 22, 24 is a sleeve 28, adapted to be registered with the apertures of a clevis or connecting bracket 29 carried by the drawn vehicle 10 at one side of the head end portion thereof. On registration of the sleeve and clevis, a pin 30 may be extended therethrough to provide a pivotal connection of the assembly 16 at its rear end, to the drawn vehicle.

If desired, a brace 31 can be extended between selected frame components of the drawn vehicle and the bracket 29, to provide desired bracing and rigidity of the drawn vehicle at the location of its connection to the hitch.

The assembly 16 further includes a second, truss-like bar structure including longitudinally aligned, closely spaced lower and upper bars 32, 34 joined by short connector pieces 36 which are welded or otherwise fixedly secured to the bars 32, 34. The connected bars 32, 34 define a side rail generally designated 35 on the assembly 16. The bars 22, 24 define a side rail generally designated 37 on the assembly 16. The rails 35, 37 converge in a forward direction, and are rigidly connected in their forwardly converging relation by a plurality of cross bars 38, 40, 42 arranged truss-fashion between the rails and welded or otherwise fixedly secured to the rails.

At their forward, convergent ends, the rails 35, 37 are fixedly connected and are secured to a clevis or hitch element 44, which is apertured to receive a connecting pin 46 (see Figure 1), said pin also being extendible through an opening provided in the rear end of the tractor draw bar 48.

A pivotal connection of the front end of the assembly 16, to the traction vehicle, is thus provided.

Fixedly secured to and projecting laterally outwardly from the rail 35, as shown in Figure 5, are apertured ears 50, 52. Ear 52 is at the rear extremity of the rail 35, while ear 50 is spaced forwardly a short distance along the length of the bar or rail 35, from the ear 52.

Considering now the construction of the tongue 18, this is also of truss-like formation in a preferred embodiment of the invention. As shown in Figure 5, it includes longitudinally aligned, closely spaced bars 54, 56 straight from end to end, said bars being secured in their closely spaced relation by connecting pieces 58 which are welded or otherwise fixedly secured to the bars.

Still referring to Figure 5, integral with and projecting laterally outwardly from the lower bar 56 are projections or ears 60, 62. Ear 60 is short in length and is apertured, having a small circular opening. Ear or projection 62 is of substantial length, and has a longitudinal slot 64.

Turning now to the lever 20, this comprises a single, elongated, flat, straight bar member 66, and welded to or otherwise made rigid with said bar member are studs 68, 70. Stud 68 extends upwardly from the bar member, a short distance rearwardly from the forward extremity thereof. Stud 70 extends downwardly from the member 66, at the forward extremity thereof.

A sleeve 72 is adapted to be fitted over the stud 68 (see Figures 5 and 6), to provide a spacer, so that a nut 73 may be applied to the sleeve without binding against the projection 62. A washer 75 is interposed between the nut 73 and the sleeve 72.

Designated at 76 is a drop pin, and in one position of the parts, shown in Figures 1 and 3, said drop pin is extended through the registered apertures of the ear 60 and of the lever member 66, the aperture of the lever member being designated at 74. In another position of the parts, shown in Figure 2, the pin 76 extends through aperture 74 of the lever, and through the aperture of the ear 50.

Considering now the assembly of the device, the three main components 16, 18 and 20 are connected together in the manner shown in Figure 3. Stud 70 extends through the aperture of ear 52, and, of course, a suitable spacer sleeve, nut, etc. would be employed to maintain the connection while still permitting free relative pivotal movement between the forward end of the lever member 66 and the rear extremity of the side rail 35 of the draw bar assembly 16.

Stud 68 extends through slot 64 in the manner shown in Figures 3 and 6. Drop pin 76, at this time, may extend through aperture 74 and ear 60 as shown in Figures 1 and 3. The rear end of rail 37 is connected by pin 30 to the hitch element or clevis 29 of the drawn vehicle 10. The forward end of the assembly 16, that is, the convergent ends of the rails 35, 37, are connected by pin 46 to the rear end of the tractor draw bar 48.

The device is now ready for use and in this relationship of the parts will appear as in Figure 1. Drawn vehicle 10 is thus in its laterally inwardly adjusted position, for road travel or for storage.

To adjust the drawn vehicle 10 to its outer position shown on Figure 2, one need merely remove the pin 76 from ear 60, after which the lever 20 is swung through less than 180° from its Figure 1 to its Figure 2 position. Lever 20, in its Figure 1 position, extends in side-by-side, parallel relation to the tongue 18, which in this position of the parts is longitudinally aligned with the side rail 35.

When lever 20 is swung to its Figure 2 position, it is now in side-by-side, parallel relation to the side rail 35, with side rail 35 and tongue 18 defining a wide obtuse angle. At this time, drop pin 76 is inserted through aperture 74 and through the aperture of ear 50.

The lever, of course, swings about the axis of its pivotal connection to the assembly 16, said pivotal connection being defined by the pin 70. During the swinging of the lever, it is adapted to move along the length of the slot 64, and thus it is apparent that in closely spaced relation to the pivotal connection 70, the lever has a sliding, pivotal connection to the front end of the tongue 18.

The particular formation and relative arrangement of the parts might, it is believed, be varied, so far as can be seen at the present time. Nevertheless, as will be noted the arrangement is such that there is a relative positioning of pivot points, which taken in conjunction with the relative form and arrangement of the components, produces the desired results clearly evident from a comparison of the Figure 1 and Figure 2 positions of the traction and drawn vehicles.

Of considerable importance is the fact that the hitch is designed to permit a swift change of the hitch position, which is desirable in view of the fact that heretofore the changing of said position has been accompanied by considerable loss of time, and by a substantial expenditure of effort on the part of the workers whose responsibility it is to make the necessary changes in the vehicle positions.

As will be noted from Figures 1 and 2, the rear end of the tongue 54 is fixedly connected by bolts 78 or by equivalent fastening elements, to the adjacent end of the axle assembly 80 of the combine, although of course this connection could be located elsewhere, according to the particular type of implement that is being drawn.

It is believed clear that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any change in construction that may be permitted within the scope of the appended claims.

What is claimed is:

1. A hitch for connecting traction and drawn vehicles, comprising a draw bar assembly having a front end connectible to a traction vehicle and a rear end connectible to a drawn vehicle; a tongue having a rear end rigidly connectible to the drawn vehicle; a lever pivotally connected at one end to the rear end of the draw bar assembly, at a location spaced transversely of said assembly from the point of connection thereof to the drawn vehicle, said lever having, intermediate its ends, a sliding, pivotal connection to the tongue; and means, at a location spaced longitudinally of the lever from its connections to said assembly and tongue for selectively engaging the lever with the draw bar assembly or tongue against movement relative thereto in the respective positions to which the lever is swung about the axis of its connection to said assembly.

2. A hitch for connecting traction and drawn vehicles, comprising: a draw bar assembly having a front end pivotally connectible to a traction vehicle and a rear end pivotally connectible to a drawn vehicle; a tongue having a rear end rigidly connectible to the drawn vehicle; a lever pivotally connected at one end to the draw bar assembly in laterally spaced relation to the connection of said assembly to the drawn vehicle, and having a pivotal connection at a location along its length spaced from the pivotal connection of the lever to the draw bar assembly, the last-named pivotal connection joining the lever to the tongue in sliding relationship, the lever swinging generally horizontally about the axis of its connection to said assembly, the other end of the lever being free to constitute a handle for swinging the same; and means for engaging the lever, at a location spaced longitudinally thereof from its pivotal connections with the draw bar assembly and tongue, against movement relative thereto in different positions to which the lever is swung about the axis of its connection to said assembly.

3. A hitch for connecting traction and drawn vehicles, comprising: an elongated draw bar assembly having a front end pivotally connectible to a traction vehicle and a rear end pivotally connectible to a drawn vehicle at one side of the draw bar assembly; a tongue having a rear end rigidly connectible to the drawn vehicle; a lever pivotally connected at one end to the rear end of the draw bar assembly at the other side of said assembly, said lever having a sliding pivotal connection to the tongue at a location along the length of the lever spaced from the pivotal connection of the lever to the draw bar assembly; and means mounted on said assembly and tongue respectively, at locations spaced longitudinally thereof from their respective connections to the lever, adapted for engaging the lever with the draw bar assembly and tongue against movement relative thereto in different positions to which the lever is swung about the axis of its connection to said assembly.

4. A hitch for connecting traction and drawn vehicles, comprising: an elongated draw bar assembly having a front end pivotally connectible to a traction vehicle and a rear end pivotally connectible to a drawn vehicle at one side of the draw bar assembly; a tongue having a rear end rigidly connectible to the drawn vehicle; a lever pivotally connected at one end to the rear end of the draw bar assembly at the other side of said assembly, said lever having a sliding pivotal connection to the front end of the tongue at a location along the length of the lever spaced rearwardly from the pivotal connection of the lever to the draw bar assembly; and means for selectively engaging the lever with either the draw bar assembly or the tongue against movement relative thereto in different positions to which the lever is swung about the axis of its pivotal connection to the draw bar assembly.

5. A hitch for connecting traction and drawn vehicles, comprising: an elongated draw bar assembly having a front end pivotally connectible to a traction vehicle and a rear end pivotally connectible to a drawn vehicle at one side of the draw bar assembly; a tongue having a rear end rigidly connectible to the drawn vehicle; a lever pivotally connected at one end to the rear end of the draw bar assembly at the other side of said assembly, said lever having a sliding pivotal connection to the front end of the tongue at a location along the length of the lever spaced rearwardly from the pivotal connection of the lever to the draw bar assembly; and means for selectively engaging the lever with either the draw bar assembly or the tongue against movement relative thereto in different positions to which the lever is swung about the axis of its pivotal connection to the draw bar assembly, said draw bar assembly including forwardly convergent side rails meeting at the front end of the draw bar assembly.

6. A hitch for connecting traction and drawn vehicles, comprising: an elongated draw bar assembly having a front end pivotally connectible to a traction vehicle and a rear end pivotally connectible to a drawn vehicle at one side of the draw bar assembly; a tongue having a rear end rigidly connectible to the drawn vehicle; a lever pivotally connected at one end to the rear end of the draw bar assembly at the other side of said assembly, said lever having a sliding pivotal connection to the front end of the tongue at a location along the length of the lever spaced rearwardly from the pivotal connection of the lever to the draw bar assembly; and means for selectively engaging the lever with either the draw bar assembly or the tongue against movement relative thereto in different positions to which the lever is swung about the axis of its pivotal connection to the draw bar assembly, said draw bar assembly including forwardly convergent side rails meeting at the front end of the draw bar assembly, the pivotal connection of the draw bar assembly to the drawn vehicle being at the rear end of one of the side rails, the pivotal connection of the lever to the draw bar assembly being at the rear end of the other side rail.

7. A hitch for connecting traction and drawn vehicles, comprising: an elongated draw bar assembly having a front end pivotally connectible to a traction vehicle and a rear end pivotally connectible to a drawn vehicle at one side of the draw bar assembly; a tongue having a rear end rigidly connectible to the drawn vehicle; a lever pivotally connected at one end to the rear end of the draw bar assembly at the other side of said assembly, said lever having a sliding pivotal connection to the front end of the tongue at a location along the length of the lever spaced rearwardly from the pivotal connection of the lever to the draw bar assembly; and means for selectively engaging the lever with either the draw bar assembly or the tongue against movement relative thereto in different positions to which the lever is swung about the axis of its pivotal connection to the draw bar assembly, said draw bar assembly including forwardly convergent side rails meeting at the front end of the draw bar assembly, the pivotal connection of the draw bar assembly to the drawn vehicle being at the rear end of one of the side rails, the pivotal connection of the lever to the draw bar assembly being at the rear end of the other side rail, said tongue and draw bar assemblies being of truss-like formation.

8. A hitch for connecting traction and drawn vehicles, comprising: draw bar means adapted to be extended between and pivotally joined to traction and drawn vehicles; connector means adapted for mounting on said drawn vehicle, and spaced laterally from the connection of the draw bar means to the drawn vehicle; a lever pivotally joined to the draw bar means for generally horizontal swinging movement in laterally spaced relation to the connection of the draw bar means to the drawn vehicle, and pivotally joined, in a sliding connection to the connector means at a location spaced longitudinally of the lever from the connection thereof to the draw bar means; and means extending from the draw bar means and connector means respectively, adapted for lockably engaging the lever against movement in respect thereto in different positions to which the lever is swung about the axis of its connection to the draw bar means.

9. A hitch as in claim 8 wherein said lever, in one position to which it is swung about the axis of its connection to the draw bar means, is disposed in closely spaced, parallel relation to the connector means, in position to be engaged by said locking means against movement in respect to the connector means, said lever, in another position to which it is swingable about the axis of its pivotal connection to the draw bar means, being disposed in closely spaced, parallel relation to the draw bar means, in position to be engaged by the locking means of the draw bar means, against movement in respect to the draw bar means.

10. A draft appliance of elongate form having a pivot means at one end for attachment to a towing vehicle, and a pair of laterally spaced pivot means on its other end for attachment to the towed vehicle, and a lever mounted at one of its ends on one of the latter pivot means, said lever having, at a point outwardly of its pivoted end, a pivot means for attachment to a portion of the towed vehicle in a sliding connection, and said lever also having, at a point outwardly of the last mentioned pivot means, a connector means for attaching the lever, respectively, to the draft appliance or to said portion of the towed vehicle, in selected positions of swing of said lever.

References Cited in the file of this patent

UNITED STATES PATENTS

| | | |
|---|---|---|
| 1,818,256 | Hoesing | Aug. 11, 1931 |
| 2,597,220 | Appel | May 20, 1952 |
| 2,615,294 | Dray | Oct. 28, 1952 |
| 2,844,931 | Irvine | July 29, 1958 |